(12) United States Patent
Mita (10) Patent No.: US 6,791,281 B2
(45) Date of Patent: Sep. 14, 2004

(54) HIGH PRESSURE DISCHARGE LAMP LIGHTING APPARATUS AND LUMINAIRE USING THEREOF

(75) Inventor: Kazutoshi Mita, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 10/446,711

(22) Filed: May 29, 2003

(65) Prior Publication Data

US 2003/0222594 A1 Dec. 4, 2003

(30) Foreign Application Priority Data

May 29, 2002 (JP) ..................................... P2002-155148
Jan. 16, 2003 (JP) ..................................... P2003-008453

(51) Int. Cl.[7] .............................................. H05B 37/02
(52) U.S. Cl. ....................... 315/224; 315/291; 315/307; 315/244
(58) Field of Search ................................. 315/224, 291, 315/307, 244, 209 R, 225, DIG. 5, DIG. 7, 360

(56) References Cited

U.S. PATENT DOCUMENTS

| 5,491,386 A | 2/1996 | Eriguchi et al. ........ 315/209 R |
| 6,437,515 B1 * | 8/2002 | Kamoi et al. ............ 315/209 R |
| 2002/0121867 A1 * | 9/2002 | Mita et al. ................... 315/219 |

FOREIGN PATENT DOCUMENTS

| JP | 2000-58284 | 2/2000 |
| JP | 3329929 | 7/2002 |

* cited by examiner

Primary Examiner—Tuyet T. Vo
(74) Attorney, Agent, or Firm—Pillsbury Winthrop LLP (57) ABSTRACT

A high-pressure discharge lamp lighting apparatus, comprises an LC resonance circuit, a DC power source, an inverter circuit, an inverter circuit and an inverter control circuit. The resonance frequency of the LC resonance circuit is set in two to three times the oscillation frequency in the steady lighting operation of the high-pressure discharge lamp. Until the high-pressure discharge lamp is started and steadily lit up, the starting control circuit controls to operate the inverter circuit at a frequency lower than the resonance frequency and not causing acoustic resonance.

9 Claims, 10 Drawing Sheets

HIGH PRESSURE DISCHARGE LAMP LIGHTING APPARATUS AND LUMINAIRE USING THEREOF

FIELD OF THE INVENTION

The present invention relates to a high-pressure discharge lamp lighting apparatus for lighting a high-pressure discharge lamp with a high-frequency AC voltage. Moreover, the present invention relates to a luminaire using such a high-pressure discharge lamp lighting apparatus.

BACKGROUND OF THE INVENTION

Generally, a discharge lamp lighting apparatus is provided with an inverter circuit and an LC resonance circuit. At the time of starting a discharge lamp, a high frequency AC voltage is initially applied from the inverter circuit to the discharge lamp through the LC resonance circuit. The frequency of the AC voltage is then gradually lowered close to a resonance frequency of the LC resonance circuit. Thereby, the output voltage of the LC resonance circuit rises. As the output voltage of the LC resonance circuit reaching a glow discharge of the discharge lamp, the glow discharge is started. After the operation of the high-intensity discharge lamp has transferred from the glow discharge to an arc discharge, an arc-spot generates on a main portion of the electrode. Then, the discharge lamp is lit up. After the discharge lamp has been lit up, the frequency of the inverter circuit is further lowered so as that the discharge lamp is steadily lit up at a frequency not involving acoustic resonance in the discharge lamp.

On the other hand, the applied voltage must be kept high for a predetermined time to ensure the glow discharge to arc discharge transition of the high-pressure discharge lamp. A prior art, JP2000-58284-A, discloses' a ballast having a booster circuit provided in preceding the inverter circuit. In a starting operation, the booster circuit boosts up the applied voltage higher than the steady lighting voltage for starting the operation of the high-pressure discharge lamp.

There exists an astable operation window, i.e., a frequency range where acoustic resonance occur in the high-pressure discharge lamp. Thereby, at the time of starting as well as in the steady lighting, a frequency in a stable operation window, i.e., a frequency range where acoustic resonance never occur in the high-pressure discharge lamp. The resonance frequency of the LC resonance circuit is set up in the stable operation window in the vicinity of or higher than the steady lighting frequency.

In this prior art, since the glow discharge causing frequency, a glow discharge to arc discharge transition causing frequency, and the steady lighting frequency reside in the stable operation window, acoustic resonance never occurs.

However, in such frequencies load characteristics of the half-bridge type inverter circuit has a stable current characteristics of generating almost constant current independently from load impedances. Moreover, when the lamp voltage varies, the lamp operating power changes extensively. Furthermore, the lamp operating power extensively changes in accordance with a frequency change. Therefore, the lamp operating power varies extensively even if a frequency slightly shifts according to a change of ambient temperature around the inverter control circuit. In the high-pressure discharge lamp, there is also a problem that a color temperature changes according to the change of the lamp operating power. Consequently, the lamp operating power is expected to be controlled to have a constant value. However, for that purpose, the high-pressure discharge lamp lighting apparatus is upsized and becomes expensive.

Furthermore, in case of switching the output voltage of the booster circuit JP2000-58284-A, the inverter control circuit becomes complicated. Furthermore, since the output voltage of the booster circuit is raised higher than the voltage in the steady lighting operation, more large-sized high electric strength components are required, and the high-pressure discharge lamp lighting apparatus is upsized. Particularly, in the high-pressure discharge lamp using a small-size bulb base, it is desirable for preventing a breakdown at the bulb base that the starting voltage generated by this high-pressure discharge lamp lighting apparatus is lowered whenever possible and that the amplitude of the starting voltage generated in every starting operation has little dispersion for every starting operation.

SUMMARY OF THE INVENTION

It is an object of the invention to provide a discharge lamp lighting apparatus with a little change in its lamp power to a change of a lamp voltage, and little dispersion in its starting voltage for every starting operation.

AD first aspect of the high-pressure discharge lamp lighting apparatus according to the present invention, comprises an LC resonance circuit, wherein the LC resonance circuit has a resonance frequency set up in two to three times the steady lighting frequency of the high-pressure discharge lamp, and the LC resonance circuit is connected to the high-pressure discharge lamp; a DC power source; an inverter circuit, wherein the inverter circuit has an input terminal connected to the DC power source, and an output terminal connected to the high-pressure discharge lamp through the LC resonance circuit, and the inverter circuit converts the DC power of the DC power source into an AC power, and causes to start and steadily operate the high-pressure discharge lamp; and an inverter control circuit, wherein the inverter control circuit is connected to a control terminal of the inverter circuit, the inverter control circuit operates the inverter circuit at a frequency around or higher than the resonance frequency of the LC resonance circuit at the time of starting the operation of the high-pressure discharge lamp, and the inverter control circuit operates the inverter circuit at a frequency in a range lower than the resonance frequency of the LC resonance circuit and free from acoustic resonance in the steady lighting operation of the high-pressure discharge lamp.

In this application, some terms are defined to have the following technical meanings, unless otherwise specified.

The term "high-pressure discharge lamp" means a mercury lamp, a metal halide lamp, a high-pressure sodium lamp, etc. The term "high-pressure discharge lamp" also admits a ceramic discharge lamp which uses an alumina for the arc tube. The arc tube is filled with at least rare gas, such as Neon (Ne), Argon (Ar), etc, as discharge agent.

The inverter circuit has, for example, a half-bridge type configuration by using two switching elements. These two switching elements alternately switch ON and OFF a DC power source so that the high-frequency AC voltage is obtained on the output side of the inverter circuit. An LC resonance circuit is connected to the output side of the inverter circuit. The resonance frequency of the LC resonance circuit is adjusted to the steady lighting frequency of the high-pressure discharge lamp. By the way, the inverter circuit may be a single-transistor type or a four-transistor type configuration.

The LC resonance circuit outputs the AC voltage at a high output rate, when the frequency of the high-frequency AC voltage applied from the inverter circuit is close to the resonance frequency. The inverter circuit is set up so that it may operate at a frequency in two to three times the resonance frequency of the LC resonance circuit at the time of starting the operation of the high-pressure discharge lamp. Thereby, the inverter circuit can steadily operate the high-pressure discharge lamp at an operating point voltage thereat the load power becomes almost maximum. The inverter circuit can prevent that the inverter circuit oscillates at an advancing phase. Therefore, a switching loss of the inverter circuit is restricted.

An inverter control circuit controls the inverter to oscillate at a frequency around or higher than the resonance frequency of the LC resonance circuit at the time of starting the operation of the high-pressure discharge lamp. And after the high-pressure discharge lamp has lit up, the inverter control circuit controls the inverter circuit to oscillate at a frequency lower than the resonance frequency of the LC resonance circuit and not causing acoustic resonance.

According to this aspect of the high-pressure discharge lamp lighting apparatus, the high-pressure discharge lamp is steadily lit up at the frequency not causing acoustic resonance and where the load power of the high-pressure discharge lamp becomes to maximum. Therefore, acoustic resonance never occurs, and even if the lamp voltage has changed, a rapid fluctuation of a load power of the high-pressure discharge lamp is restricted. The frequency is kept constant during the steady lighting operation of the high-pressure discharge lamp. Thereby, an abnormal high voltage is not generated at the lamp-life terminal.

A second aspect of the high-pressure discharge lamp lighting apparatus according to the present invention, comprises an LC resonance circuit, wherein the LC resonance circuit has a resonance frequency set up in two to three times the steady lighting frequency of the high-pressure discharge lamp, and the LC resonance circuit is connected to the high-pressure discharge lamp; a DC power source; an inverter circuit, wherein the inverter circuit having an input terminal where the inverter circuit was connected to the DC power source, and an output terminal connected to the high-pressure discharge lamp through the LC resonance circuit, and the inverter circuit converts the DC power of the DC power source into an AC power, and causes to start and steadily operate the high-pressure discharge lamp; and an inverter control circuit, wherein the inverter control circuit is connected to control terminal of the inverter circuit, the inverter circuit operates the inverter control circuit for a predetermined time from the time of starting the operation of the high-pressure discharge lamp at a frequency around or higher than the resonance frequency of the LC resonance circuit, and the inverter control circuit operates the inverter circuit at a frequency in a range lower than the resonance frequency of the LC resonance circuit and free from acoustic resonance in the steady lighting operation of the high-pressure discharge lamp.

The second aspect of the high-pressure discharge lamp lighting apparatus is characterized by that the inverter circuit operates at a frequency higher than frequency at the time of the steady lighting for a prescribed time from the time of starting the operation of the high-pressure discharge lamp.

The high-pressure discharge lamp has a property that a glow discharge occurs initially and then the discharge lamp is lit up at the time the glow discharge has transferred to an arc discharge. Consequently, at the time of starting, for a predetermined time after the time of starting the inverter circuit are operated at the frequency higher than a frequency in the steady lighting operation of the high-pressure discharge lamp, thereby the glow discharge to arc discharge transition is ensured.

For example, an inverter control circuit applies a frequency about four times the high frequency of the steady lighting to the inverter circuit at the time of starting. Then, the frequency of the AC voltage is lowered gradually. Then, in the meantime the glow discharge occurs around the electrodes of the high-pressure discharge lamp. And the frequency of the AC voltage is further lowered to the vicinity of the resonance frequency of the LC resonance circuit. And it is maintained at a frequency around or higher than the resonance frequency. In the meantime, a glow discharge to arc discharge transition is ensured in the high-pressure discharge lamp, and thus the high-pressure discharge lamp is lit up.

According to a second aspect of the high-pressure discharge lamp lighting apparatus, a glow discharge to arc discharge transition is ensured in the high-pressure discharge lamp. Therefore, the high-pressure discharge lamp can be surely lit up.

A third aspect of the high-pressure discharge lamp lighting apparatus according to the present invention is characterized by that when the high-pressure discharge lamp is that filled with Neon and Argon, the predetermined time is set up in 1–10 seconds.

While, a fourth aspect of the high-pressure discharge lamp lighting apparatus according to the present invention is characterized by that when the high-pressure discharge lamp is that filled with only Argon, the predetermined time is set up in 0.1–1.5 seconds.

The glow discharge to arc discharge transition time differs in accordance with the type of the rare gas filled in the high-pressure discharge lamp. Thereby, the third aspect of the high-pressure discharge lamp lighting apparatus sets up the predetermined time appropriately according to the type of the rare gas. According to the third and fourth aspects of the high-pressure discharge lamp lighting apparatus, a glow discharge to arc discharge transition can be executed appropriately in response to the type of rare gas filled in the high-pressure discharge lamp.

A fifth aspect of the high-pressure discharge lamp lighting apparatus according to the present invention, further comprises a starting control circuit, wherein the starting control circuit judges whether the high-pressure discharge lamp is in non-lighting state, and when it is judged that the high-pressure discharge lamp is in non-lighting state, the starting control circuit intermittently operates the inverter control circuit.

A starting control circuit has the lamp voltage detection circuit which detects the lamp voltage of the high-pressure discharge lamp, the oscillation halting circuit which stops the oscillation of an inverter control circuit when abnormal lamp voltage is detected in the lamp voltage detection circuit, and the timer circuit which counts the time after the starting control operation of the starting control circuit begins. And if an abnormal lamp voltage is detected, it is judged with the high-pressure discharge lamp being in non-lighting state. In the case, the starting control circuit controls the starting and the steadily lighting of the high-pressure discharge lamp 12 are intermittently executed at an interval of a predetermined time.

According to the fifth aspect of the high-pressure discharge lamp lighting apparatus a high voltage required for starting and steadily lighting up the discharge lamp is intermittently applied when the high-pressure discharge lamp is in a non-lighting state. Thus it can be prevented that the high voltage is continuously applied to the high-pressure discharge lamp.

A sixth aspect of the high-pressure discharge lamp lighting apparatus according to the present invention, further comprises a booster circuit, wherein the booster circuit is connected between the DC power supplies and the inverter circuits, the booster circuit keeps the DC voltage applied in the inverter circuit constant, and at the time of starting the operation of the high-pressure discharge lamp, the inverter control circuit controls the inverter circuit so that the output current of the LC resonance circuit becomes fixed.

The booster circuit is connected to the input side of the inverter circuit. Thereby, the DC voltage applied to the inverter circuit is kept constant. An inverter control circuit controls the starting voltage to have less dispersion in every starting operation by feeding back the resonance current of the LC resonance circuit and controlling the oscillation frequency so as that the resonance current of the LC resonance circuit becomes constant at the time of starting the operation of the high-pressure discharge lamp in every starting operation. Thereby, the starting voltage is made to have less dispersion in every starting operations.

According to the sixth aspect of the high-pressure discharge lamp lighting apparatus, the DC voltage of the booster circuit applied to the inverter circuit is controlled equivalently. Consequently, as the current supplied to the LC resonance circuit is controlled to be kept constant, the starting voltage of the LC resonance circuit is controlled in constant. Therefore, the amplitude of the starting voltage applied to the high-pressure discharge lamp becomes almost the same amplitude in every starting operation. Thereby the dispersion of the high-pressure discharge lamp in every starting operation is decreased. Therefore, it becomes possible to miniaturize the bulb base of the high-pressure discharge lamp, and the luminaire using the high-pressure discharge lamp and the high-pressure discharge lamp can be miniaturized.

A seventh aspect of the high-pressure discharge lamp lighting apparatus according to the present invention, is characterized by that when the intermittent starting control of the starting control circuit has continued for a predetermined time, at least the inverter control circuit halts.

In the seventh aspect of the high-pressure discharge lamp lighting apparatus, a starting control circuit has the lamp voltage detection circuit which detects the lamp voltage of the high-pressure discharge lamp, the oscillation halting circuit which halts the oscillation of an inverter control circuit when abnormal lamp voltage is detected in the lamp voltage detection circuit, and the timer circuit which counts the time after the starting control operation of the starting control circuit has started. And if an abnormal lamp voltage is detected, it is judged with the high-pressure discharge lamp being in non-lighting state. In the case, the starting control circuit controls the starting and the steadily lighting of the high-pressure discharge lamp 12 are intermittently executed at an interval of a predetermined time. And when the intermittent starting control has continued for a predetermined time, at least the inverter control circuit is halted.

High-pressure discharge lamps have an attribute that after a long term of extinction the glow discharge starting voltage stays in low, while immediately after a extinction the glow discharge starting voltage stays in high. Then, when the high-pressure discharge lamp fails to be lit up even if the starting operation has been continued for a predetermined time, at least the inverter control circuit is halted. And thus the inverter circuit is also halted.

According to the seventh aspect of the high-pressure discharge lamp lighting apparatus, when the high-pressure discharge lamp fails to be lit up within a predetermined time, at least the inverter control circuit is halted. Therefore, it is prevented that the starting voltage is wastefully applied to the discharge lamp for a long time repeatedly. Therefore, a high-pressure discharge lamp getting old over its lifetime can be safely exchanged.

A luminaire according to further aspect of the present invention, comprises the high-pressure discharge lamp lighting apparatus as claimed in any one of claims 1 to 7; and a main body capable of equipping the high-pressure discharge lamp operable with the high-pressure discharge lamp lighting apparatus.

According to the further aspect of the present invention, the luminaire is also able to have the effects obtained in the first to seventh aspects of the high-pressure discharge lamp lighting apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 1 through 9.

Figure 1:
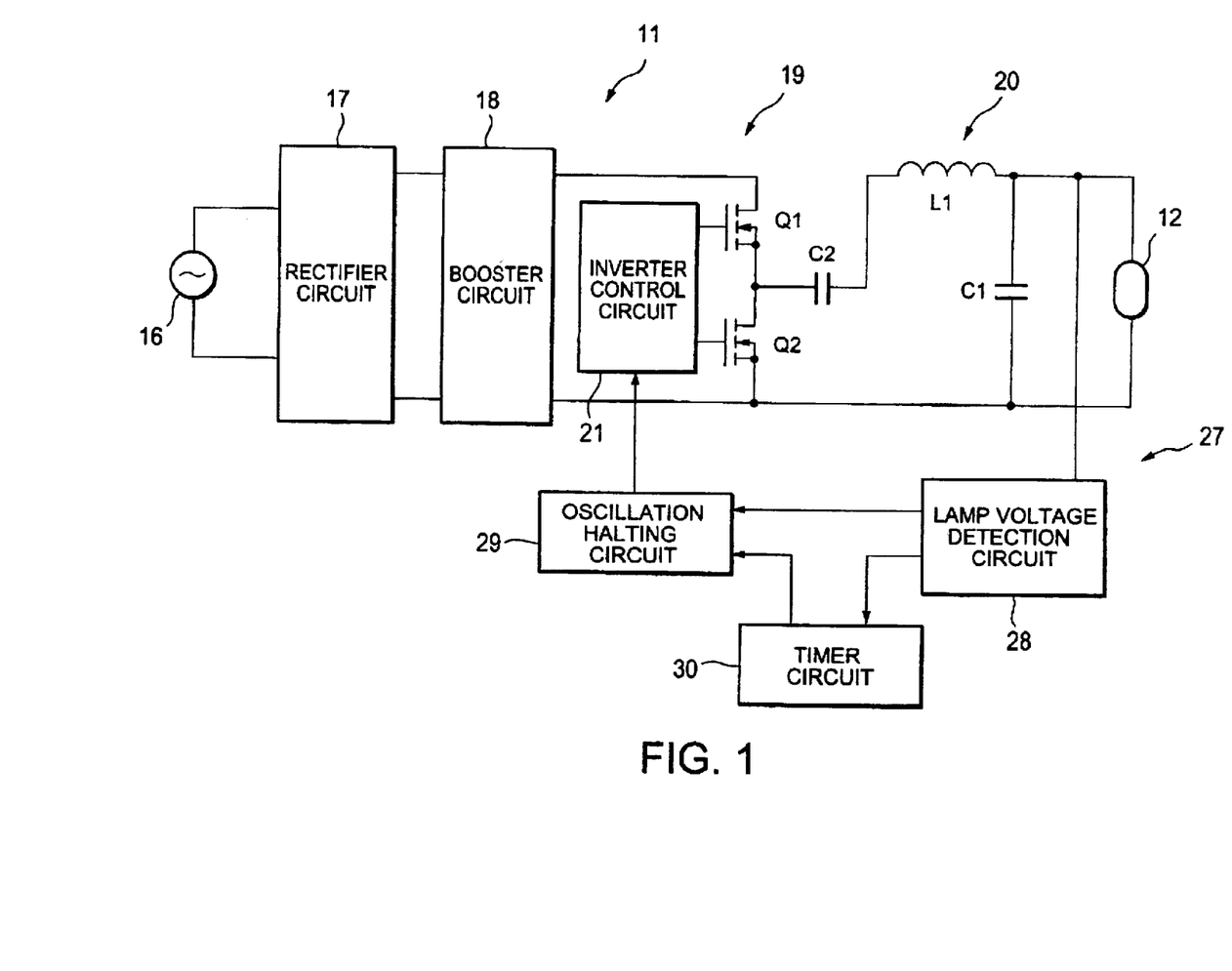
FIG. 1 is a block diagram of the high-pressure discharge lamp lighting apparatus according to the first embodiment of the invention.
Figure 2:
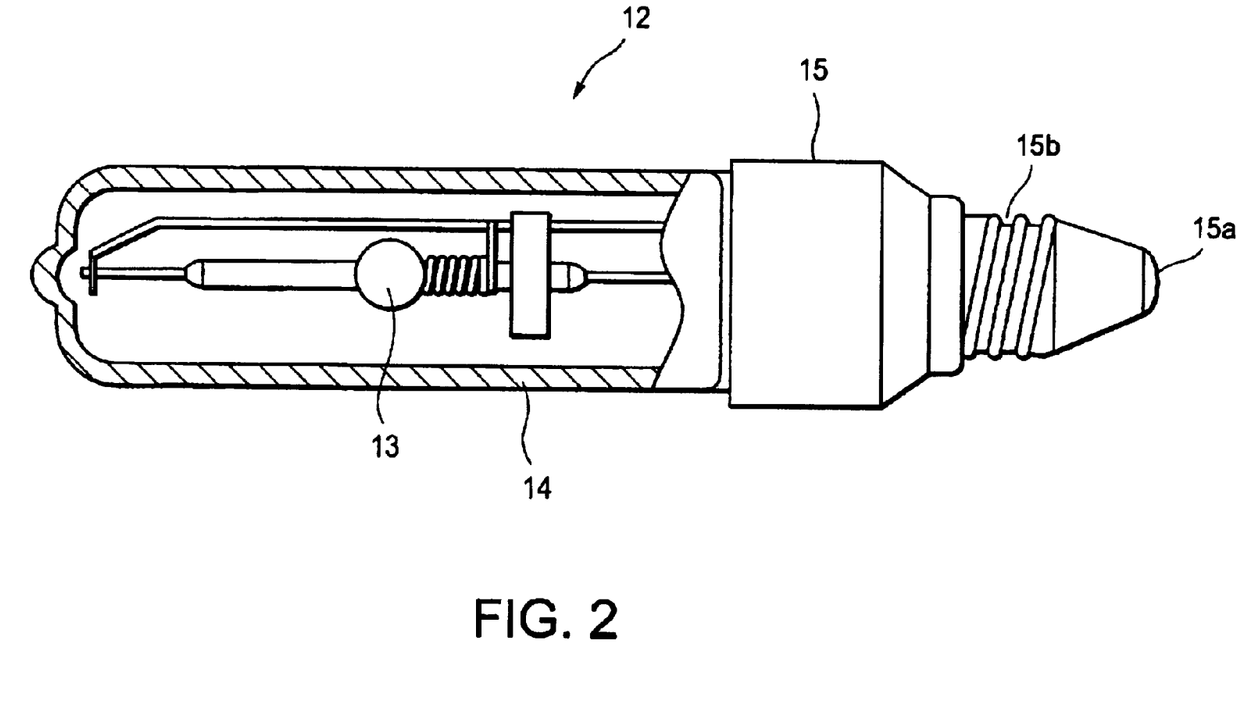
FIG. 2 is an explanatory drawing of an example of the high-pressure discharge lamp used in the embodiment of the invention.

Referring now to FIG. 1 and, a first embodiment of the present invention will be explained. FIG. 1 shows a configuration of the high-pressure discharge lamp lighting apparatus 11 according to the first embodiment of the invention. FIG. 2 shows an example of the high-pressure discharge lamp 12 used with the high-pressure discharge lamp lighting apparatus of the invention.

The high-pressure discharge lamp 12 shown in FIG. 2 is a ceramic discharge lamp using translucent alumina for the arc tube 13. The alumina used for the arc tube 13 is thermally and chemically stable against metal halide filled in an arc tube more than generally used silica glass. An arc tube 13 is enclosed in the outer bulb 14 whose inside is maintained in a vacuum state, and a bulb base 15 is formed on one end of the outer bulb 14. High-frequency AC voltage is applied from the high-pressure discharge lamp lighting apparatus 11 between a tip end terminal 15a of a bulb base 15 and a side-wall screw terminal 15b.

In FIG. 1, the high-pressure discharge lamp lighting apparatus 11 is provided with a rectifier circuit 17 for converting AC voltage from a commercial AC line 16 to DC voltage, a booster circuit 18 which boosts up the DC voltage obtained in the rectifier circuit 17, a half-bridge type inverter circuit 19 for generating a high-frequency AC voltage, an LC resonance circuit 20 which applies the high-frequency AC voltage generated in the inverter circuit 19 to the high-pressure discharge lamp 12, an inverter control circuit 21 for controlling the inverter circuit 19, and a starting control circuit 27 for intermittently operating the inverter control circuit 21.

The starting control circuit 27 comprises a lamp voltage detection circuit 28 which detects the lamp voltage of the high-pressure discharge lamp 12, an oscillation halting circuit 29 which halts the oscillation of the inverter control circuit 21 when abnormal lamp voltage is detected in the lamp voltage detection circuit 28, and a timer circuit 30 which counts the time elapsing from starting the starting control operation of the starting control circuit 27.

The AC voltage from the commercial AC line 16 is converted to a DC voltage by being rectified in a rectifier circuit 17. The DC voltage is then applied to the booster circuit 18. A booster circuit 18 boosts up the DC voltage which comprised a chopper circuit and was obtained in the rectifier circuit 17.

The DC voltage boosted up in the booster circuit 18 is applied to the series circuit of two switching elements Q1 and Q2 which constitute the inverter circuit 19. These two switching elements Q1 and Q2 in the inverter circuit 19 are so controlled to alternately switch ON and OFF at the oscillation frequency of the inverter control circuit 21. Consequently, the high-frequency AC voltage is applied to the LC resonance circuit 20 from the inverter circuit 19.

The LC resonance circuit 20 comprises an inductor L1 and a capacitor C1. The high-frequency AC electric power supplied to the high-pressure discharge lamp 12 from the LC resonance circuit 20 has a continuous current component cut by the DC cut capacitor C2. Here, an inductor L1 and a capacitor C1 are set up so that the resonance frequency f0 of the LC resonance circuit 20 becomes a frequency in two to three times the oscillation frequency f1 in the steady lighting operation of the high-pressure discharge lamp 12.

Thus, the inverter control circuit 21 controls the inverter circuit 19 at a frequency f01 around or higher than the resonance frequency f0 of the LC resonance circuit 20. At that time, the starting control circuit 27 controls the inverter control circuit so that the starting voltage of the high-pressure discharge lamp 12 is generated once, or more than once intermittently until the discharge lamp being lit up when the discharge lamp fails to be lit up at the first time. That is, the lamp voltage detection circuit 28 of the starting control circuit 27 judges whether the high-pressure discharge lamp 12 is lighting or not lighting based on the lamp voltage of the high-pressure discharge lamp 12. When it is judged that the high-pressure discharge lamp 12 is not lighting, the starting control circuit 27 controls the inverter control circuit 21 to start and then steadily light up the high-pressure discharge lamp 12. When the high-pressure discharge lamp 12 fails to be lit up, and a predetermined time has elapsed, the oscillation halting circuit 29 halts the oscillation of the inverter control circuit 21. After a predetermined time has elapsed the starting control circuit 27 again operates the inverter control circuit 21 to start and then steadily light the high-pressure discharge lamp 12. The starting control circuit 27 intermittently executes such a sequence of operations at a predetermined time of interval.

The executing time of the intermittent starting control operation is counted in the timer circuit 30. When the high-pressure discharge lamp 12 fails to be lit up even if the intermittent starting control operation lasts more than a predetermined time, the inverter control circuit 21 is halted.

Until the inverter control circuit 21 is started and the steadily lit up by the intermittent starting operation control, the starting control circuit 27 controls to operate the inverter circuit 19 at a frequency f1 lower than the resonance frequency f0 and not causing acoustic resonance. The starting control circuit 27 also controls the inverter control circuit 21 to operate the inverter circuit 19 at the frequency f1 lower than the resonance frequency f0 and not causing acoustic resonance, after the high-pressure discharge lamp 12 has been started and then steadily lit up by the intermittent starting control.

Figure 3:
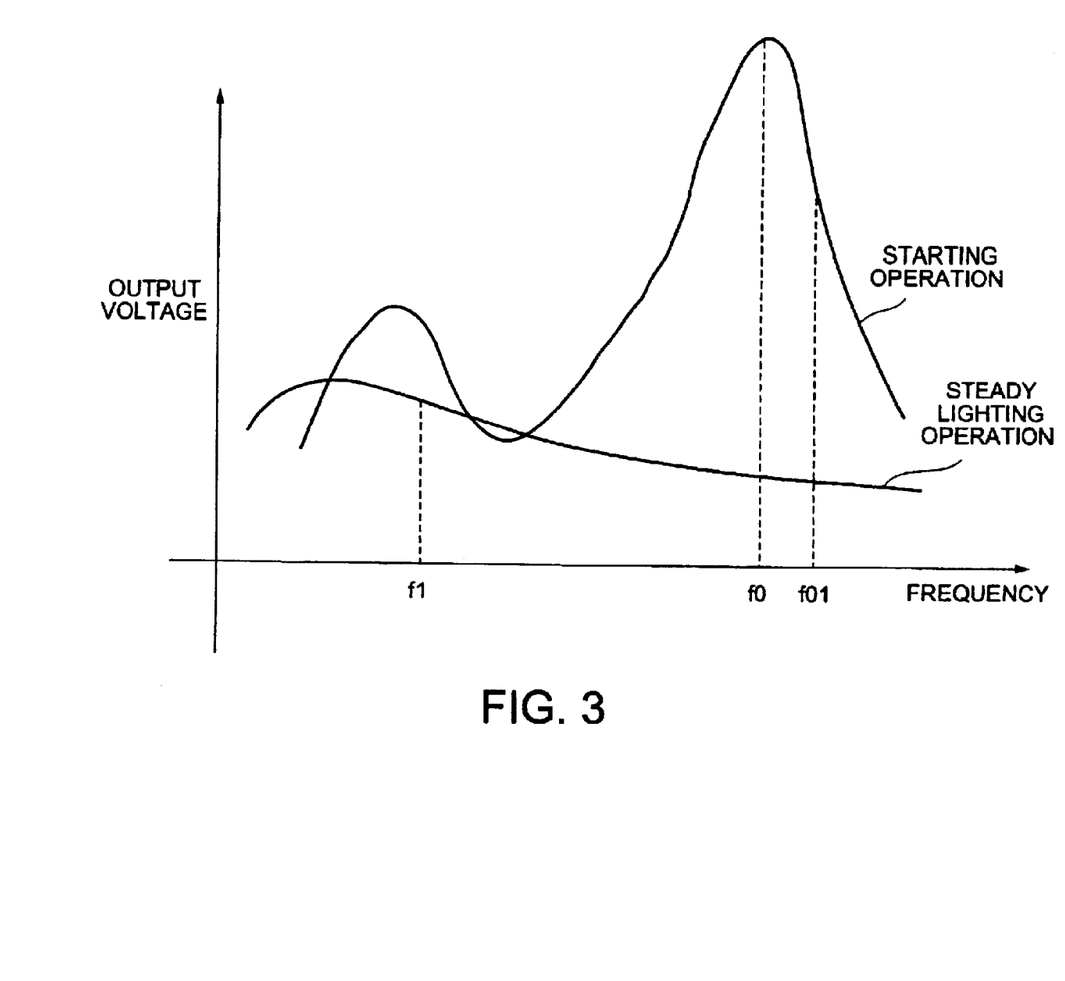
FIG. 3 is a graph showing the relation of the output voltage (lamp voltage VL) of the inverter circuit and the frequency according to the first embodiment of the invention.

FIG. 3 is a graph showing the relation between the output voltage at the time of starting the inverter circuit 19 in the first embodiment, and the steady lighting (lamp voltage VL), and frequency. As shown in FIG. 3, at the time of starting the operation of the high-pressure discharge lamp, the inverter circuit 19 is controlled to initiate oscillating at the frequency f01 higher than the resonance frequency f0. After that, the oscillation frequency is lowered closely to the resonance frequency f0. And when the glow discharge shifts to arc discharge, the high-pressure discharge lamp 12 is lit up. After the glow discharge to arc discharge transition voltage is completed, the high-pressure discharge lamp 12 is stably lit up at the frequency f1 lower than the LC resonance frequency f0 and residing in the stable operation window in which acoustic resonance never occurs.

Figure 4:
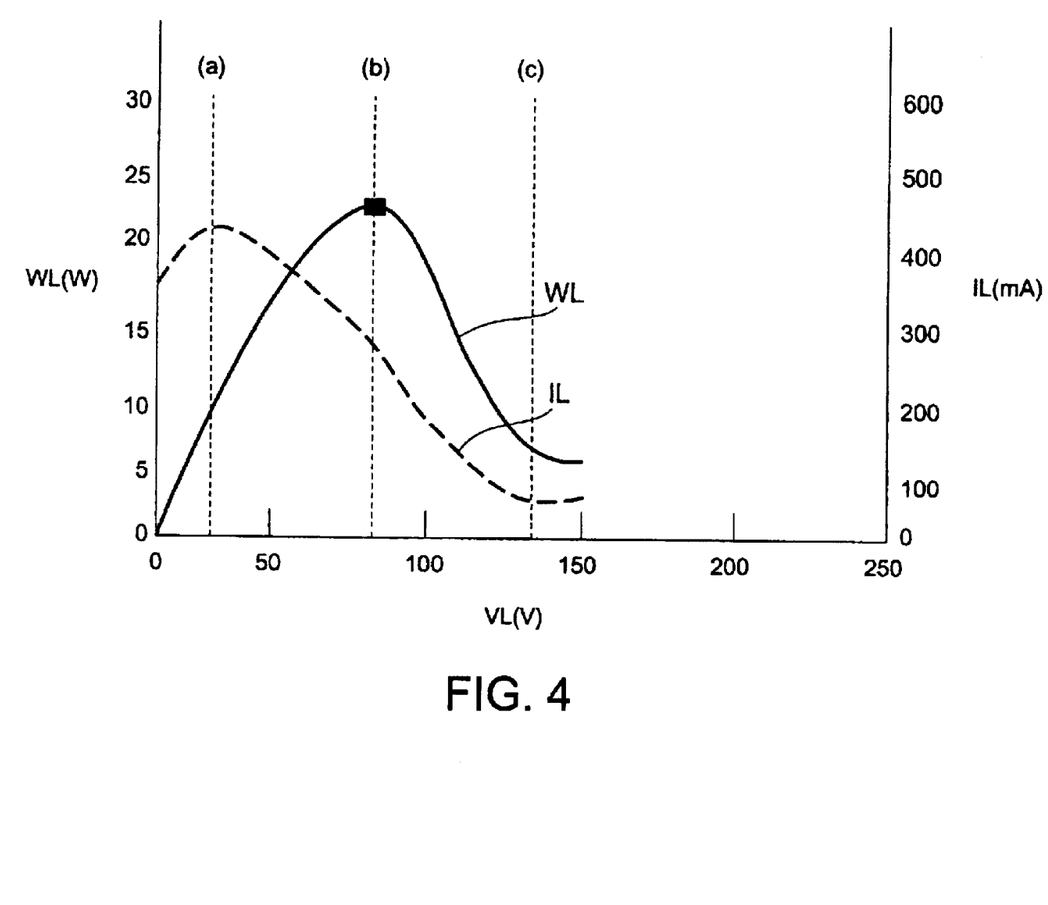
FIG. 4 is a graph showing the load characteristics of the LC resonance circuit according to the first embodiment of the invention.

FIG. 4 is a graph showing the load characteristics of the LC resonance circuit 20 in the first embodiment. The graph in FIG. 4 shows the relation between the load power WL in the steady lighting operation of the high-pressure discharge lamp. 12 and lamp current IL, and the output voltage (lamp voltage) VL of the inverter circuit 19. When the resonance frequency f0 of the LC resonance circuit 20 is set up in the frequency two to three times the oscillation frequency f1 in the steady lighting operation of the high-pressure discharge lamp 12, the discharge lamp 12 is steadily lit up at the operating point voltage (b) where the load power WL becomes maximum. Therefore, even if the lamp voltage VL has varied in the vicinity of the operating point voltage (b), there is little fluctuation of the load power WL of the high-pressure discharge lamp 12.

Figure 5A:
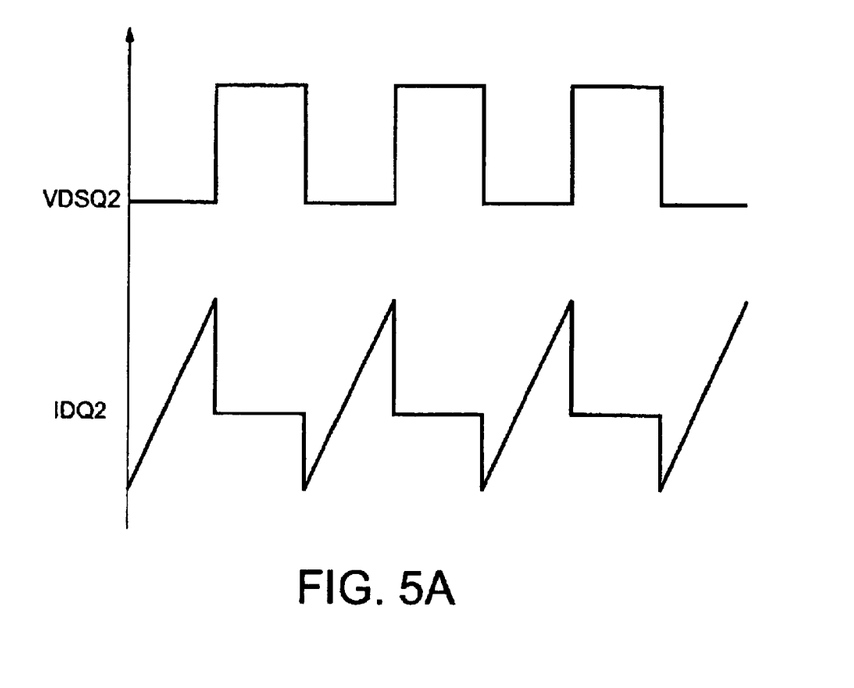
FIG. 5 is a waveform diagram of the drain-source voltage of the switching element Q2 in each operating point voltage shown by (a), (b), and (c) in FIG. 4, and drain current.
Figure 5B:
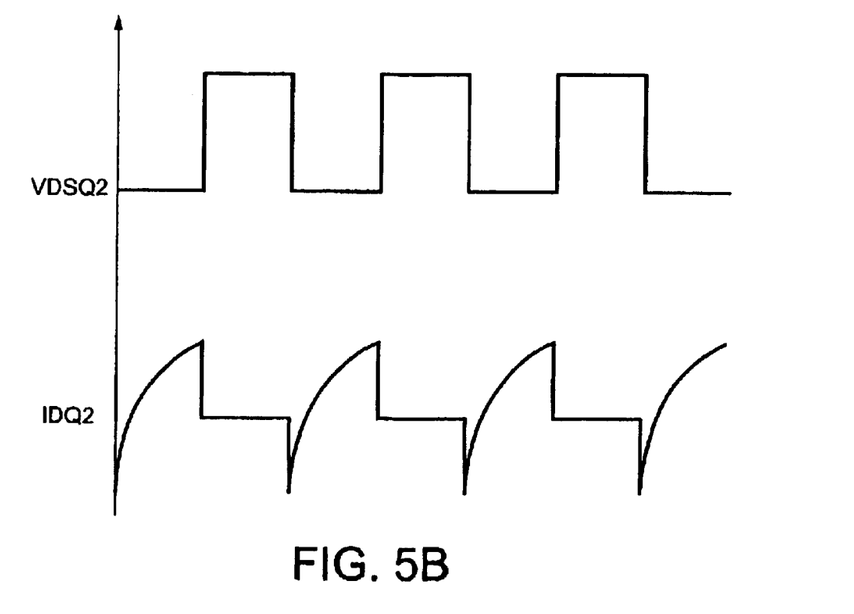
Figure 5C:
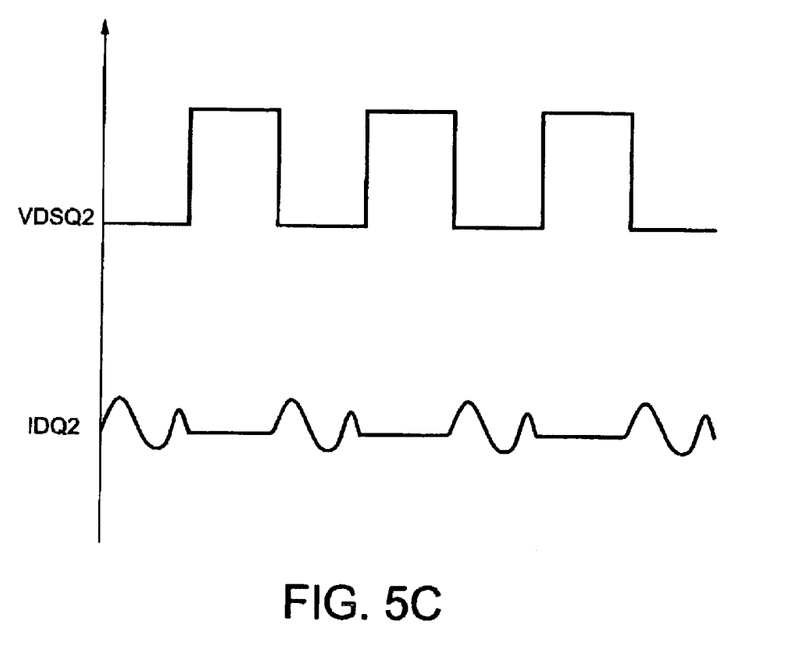

FIG. 5 is a waveform diagram of the drain-source voltage VDSQ2 and the drain current IDQ2 of the switching element Q2 at the operating point voltages (a), (b), and (c) shown in FIG. 4. At the low operating point voltages (a), (b) as shown in FIG. 4, the high-pressure discharge lamp 12 and the LC resonance circuit 20 form an inductive circuit, and the switching element Q2 executes a good advancing phase switching operation. At the high operating point voltage (c) as shown in FIG. 4, the switching element Q2 executes a lagging phase switching with a tertiary acoustic resonance frequency of the high-pressure discharge lamp.

Here, in the first embodiment, the high-pressure discharge lamp 12 is lit up in the lamp-life terminal at the frequency f1 the same as the frequency used in the normal time. The load characteristics of the high-pressure discharge lamp lighting apparatus approaches to non-load condition in the lamp-life terminal. Thereby the lamp voltage VL rises to the vicinity of the operating point voltage (c). At this time, the LC resonance circuit 20 operates at a tertiary acoustic resonance frequency, and the switching elements Q1 and Q2 are maintained in the lagging phase switching state.

As mentioned above, at the time of starting the operation of the high-pressure discharge lamp 12, the inverter circuit 19 operates at the frequency f01 around or higher than the LC resonance frequency f0. For example, at the time of starting, the inverter circuit 19 is operated at the frequency about four times the steady lighting frequency, and a glow discharge occurs in the high-pressure discharge lamp 12. After that, the frequency is lowered to the vicinity of the resonance frequency f0 of the LC resonance circuit 20, thereat the discharge in the high-pressure discharge lamp 12 shifts from a glow discharge to an arc discharge transition. The high-pressure discharge lamp 12 is lit up by the glow discharge to arc discharge transition.

Even if the high-pressure discharge lamp 12 is lit up the inverter control circuit 21 may be made to operate at a frequency equal to or higher than the resonance frequency f0 of the LC resonance circuit 20 for a predetermined time after the starting operation for ensuring the glow discharge to arc discharge transition in the high-pressure discharge lamp 12. This predetermined time is set up according to the type of rare gas filled in the high-pressure discharge lamp 12. According to an experiment, in the high-pressure discharge lamp 12 filled with Neon and Argon, 1–10 seconds ware suitable. In the high-pressure discharge lamp 12 filled with Argon, 0.1–1.5 seconds ware suitable.

Figure 6:
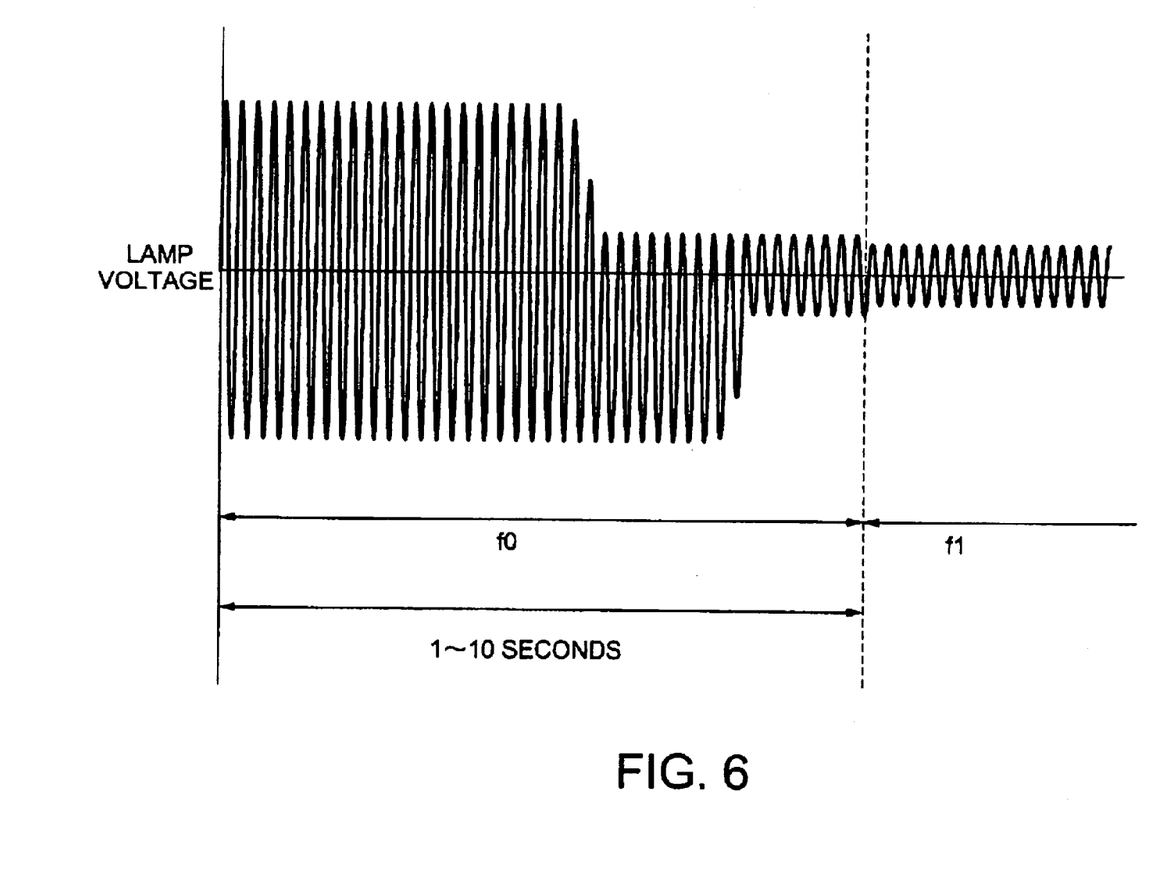
FIG. 6 is an explanatory drawing for the oscillation frequency and the output voltage at the glow discharge to arc discharge transition time with the high-pressure discharge lamp lighting apparatus according to the first embodiment of the invention.

FIG. 6 is an explanatory drawing of the starting control to the high-pressure discharge lamp 12 filled with Neon and Argon. In this type of the high-pressure discharge lamp 12, the oscillation frequency is kept in the resonance frequency f0 of the LC resonance circuit 20 for 1–10 seconds after the time of starting, and after that it is shifted to the frequency f1 in the steady lighting operation. For example, when a voltage with the resonance frequency f0 of the LC resonance circuit 20 is applied to the high-pressure discharge lamp 12, glow discharges occur around both electrodes of the high-pressure discharge lamp 12, and it then transfers to an arc discharge. In the case, the voltage with the LC resonance frequency f0 is applied to the high-pressure discharge lamp 12 until the arc discharge begins surely with both electrodes, since the glow discharges around both electrodes does not necessarily transfer to the arc discharge simultaneously. Thereby, a glow discharge to arc discharge transition is ensured. In the high-pressure discharge lamp 12 filled with Argon the oscillation frequency is kept in the resonance frequency f0 of the LC resonance circuit 20 for 0.1–1.5 seconds, and after that it is shifted to the frequency f1 in the steady lighting operation.

In this case, the resonance frequency f0 of the LC resonance circuit 20 need not be equal to a non-acoustic resonance frequency, while it may be equal to an acoustic resonance frequency. For several seconds after the starting operation the lamp voltage is maintained at a low voltage and the lamp poser is kept in a low range due to that the temperature inside the arc tube is lowered. Thus even if the frequency applied to the high-pressure discharge lamp for the time periods has fell in an acoustic resonance frequency, it is prevented from over load against the high-pressure discharge lamp or the lighting apparatus.

According to the first embodiment, the high-pressure discharge lamp 12 is steadily lit up at the frequency not causing an acoustic resonance and where the load power of the high-pressure discharge lamp 12 becomes to maximum. Therefore, acoustic resonance never occurs, but even if it moreover changes lamp voltage, rapid fluctuation of the load power of the high-pressure discharge lamp is restricted. The frequency is kept constant during the steady lighting operation of the high-pressure discharge lamp 12. Thereby, the abnormal high voltage is not generated at the lamp-life terminal of the high-pressure discharge lamp 12, or the switching operation fails to become abnormal. For a predetermined time from the time of starting the operation of the high-pressure discharge lamp 12 the frequency f01 is kept around or higher than the resonance frequency f0. Thus, the glow discharge to arc discharge transition of the high-pressure discharge lamp 12 can be ensured, and the output voltage applied to the high-pressure discharge lamp so that time to transfer may become suitable can be adjusted.

Figure 7:
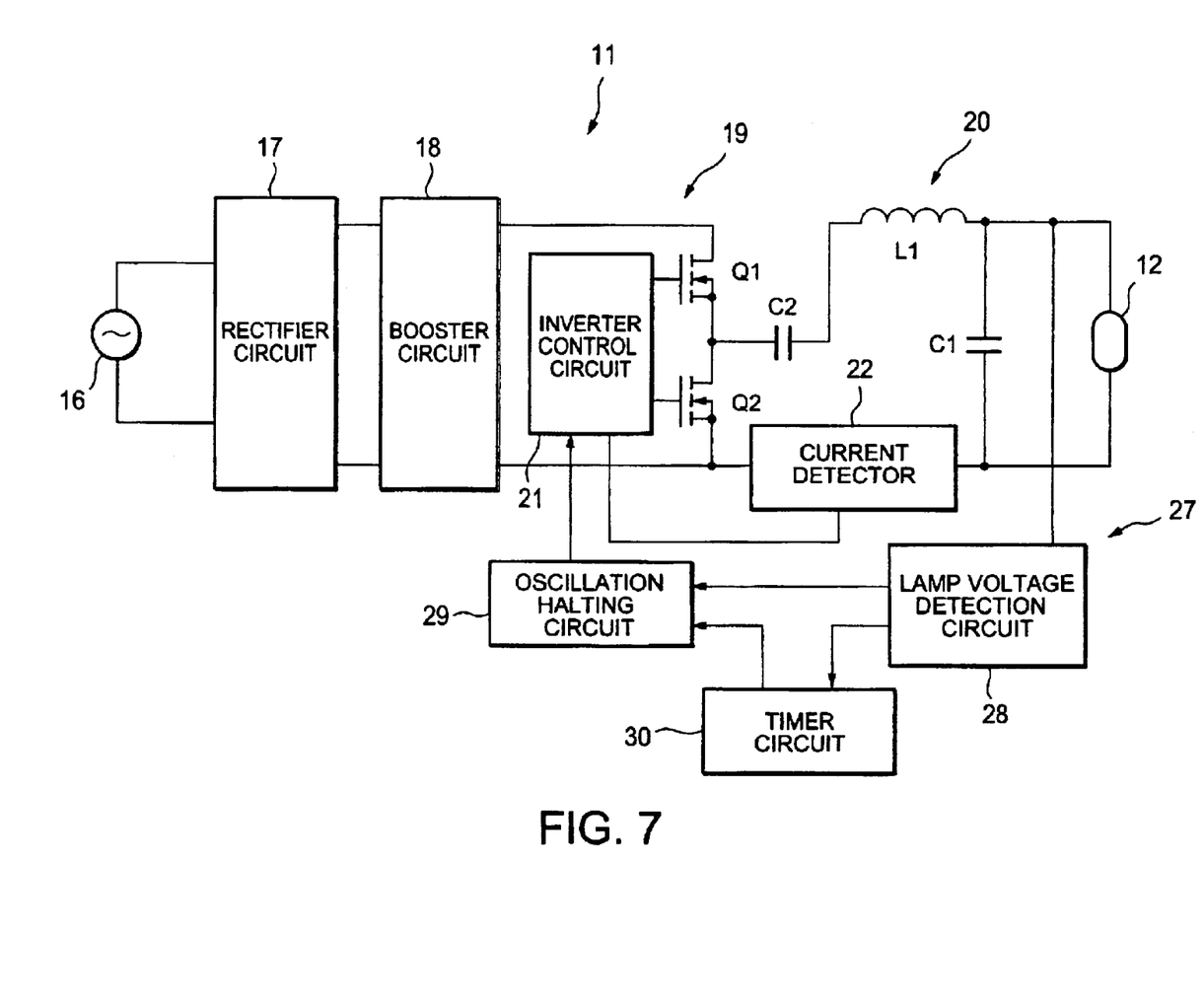
FIG. 7 is a block diagram of the high-pressure discharge lamp lighting apparatus according to the second embodiment of the invention.

Referring now to FIG. 7, a second embodiment of the invention will be explained. FIG. 7 is a block diagram of the high-pressure discharge lamp lighting apparatus according to the second embodiment of the invention. In this second embodiment, the DC voltage applied to the inverter circuit 19 is kept constant, and the inverter control circuit 21 controls the inverter circuit 19 so that the resonance current of the LC resonance circuit 20 becomes constant. According to the control the starting voltage applied to the high-pressure discharge lamp 12 becomes almost the same amplitude in every starting operation. Thereby it is prevented that a high voltage is applied and that the bulb base 15 of the high-pressure discharge lamp 12 is broken down. The output voltage of a booster circuit 18 shall be a prescribed equivalent value in both the starting operation and the steady lighting operation of the high-pressure discharge lamp 12.

The AC voltage from the commercial AC line 16 is converted to a DC voltage by being rectified in a rectifier circuit 17. The DC voltage is then applied to the booster circuit 18. The booster circuit 18 keeps the DC voltage obtained in the rectifier circuit 17 in a prescribed equivalent value. The inverter control circuit 21 feeds back the resonance current of the LC resonance circuit 20 detected by the current detector 22, and controls the frequency for switching the two switching elements Q1 and Q2 of the inverter circuit 19 so that the resonance current of the LC resonance circuit 20 becomes the prescribed equivalent value. A voltage with predetermined amplitude is generated across the capacitor C1.

When the lamp voltage in exceeding a prescribed value continues for a predetermined time, the lamp voltage detection circuit 28 of the starting control circuit 27 makes operate the oscillation halting circuit 29, and thus halting the inverter circuit 19 through the inverter control circuit 21. As a result, the starting voltage of the high-pressure discharge lamp 12 is generated once, or more than once intermittently until the discharge lamp being lit up when the discharge lamp has failed to be lit up at the first time. Therefore, the DC voltage applied to the inverter circuit 19 is kept constant, and the resonance current in the LC resonance circuit 20 is detected by the current detector 22. The resonance current is fed back so as that the resonance current is kept constant. Thereby, the amplitude of the starting voltage applied to the high-pressure discharge lamp 12 becomes almost equivalent in every starting operations.

The LC resonance circuit 20 comprises an inductor L1 and a capacitor C1. Then, the high-frequency AC voltage generated in the inverter circuit 19 is applied to the LC resonance circuit 20 through a DC cut capacitor C2. The LC resonance circuit 20 applies a high power to the high-pressure discharge lamp 12 in proportion to the frequency of the high-frequency AC voltage applied from the inverter circuit 19.

Thus, the DC voltage applied to the inverter circuit 19 is kept constant by a booster circuit 18. Accordingly, the resonance current of the LC resonance circuit 20 is controlled to be kept constant by the function of the inverter control circuit 21 controlling to keep the resonance current constant. Therefore, the control of the inverter control circuit 21 keeping the resonance current constant becomes the same thing with the control of keeping the starting voltage constant. According to the control function of keeping the resonance current constant, a moderate starting voltage being not too high to the withstand voltage of a small-size bulb base, and being not too low to start the high-pressure discharge lamp 12 is supplied to the high-pressure discharge lamp.

Figure 8:
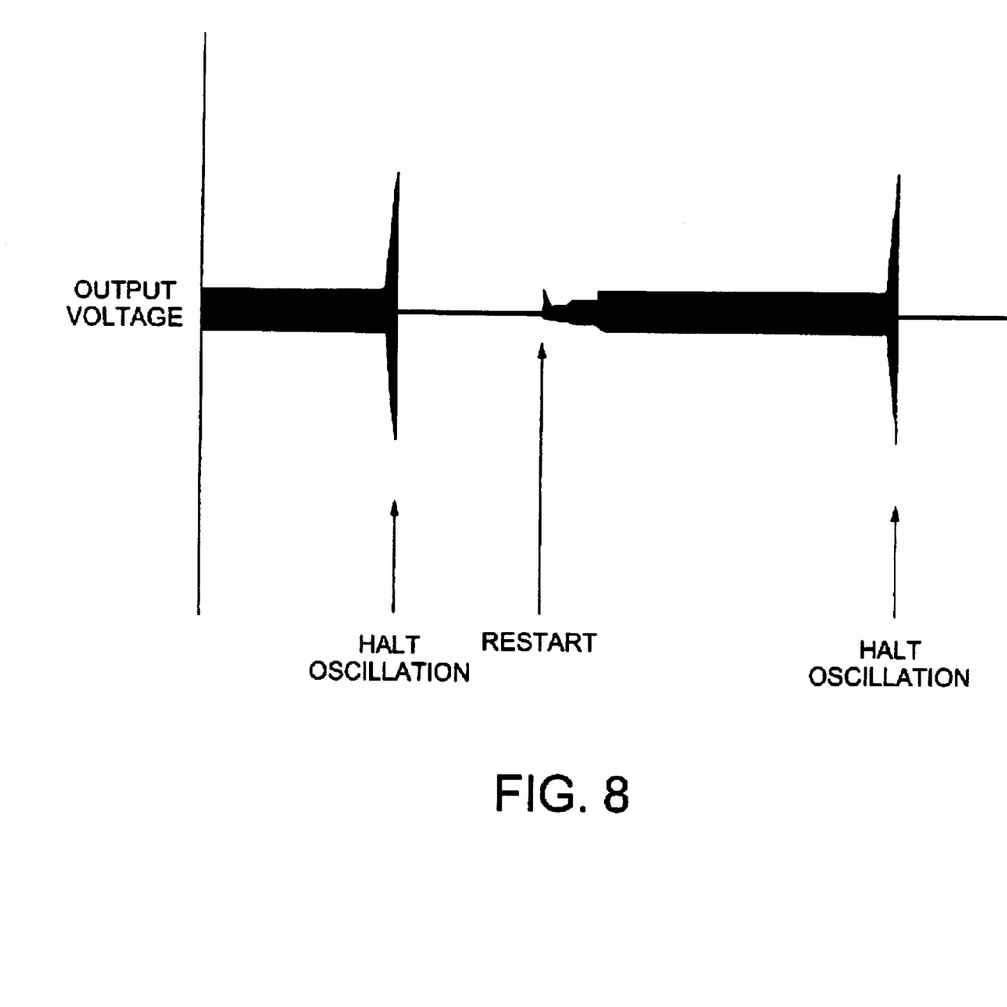
FIG. 8 is an explanatory drawing of the output voltage (lamp voltage) of the inverter circuit according to the second embodiment of the invention.

FIG. 8 is an explanatory drawing of the output voltage (lamp voltage) of the inverter circuit 19 according to the second embodiment. The inverter control circuit 21 controls the amplitude of the starting voltage to be kept constant, by controlling the current applied from the LC resonance circuit 20 to the high-pressure discharge lamp 12 to be kept constant in a state that the DC voltage applied to the inverter circuit 19 is kept constant. The lamp voltages of the high-pressure discharge lamp 12 thus started and lit up is detected by the lamp voltage detection circuit 28 of the starting control circuit 27. When the lamp voltage in exceeding a prescribed value continues for a predetermined time, the oscillation halting circuit 29 will be operated and the inverter circuit 19 will be stopped. After elapsing a prescribed time, the control of starting and steadily lighting the high-pressure discharge lamp 12 is again executed. The same operation is intermittently repeated until the high-pressure discharge lamp 12 cools down so that the high-pressure discharge lamp 12 is started and steadily lighted. When the high-pressure discharge lamp 12 fails to be lit up even if such a state continues for a predetermined time, the timer circuit 30 operates to halt at least the inverter circuit 19.

The high-pressure discharge lamp has a feature that after a long duration of extinction it is easy to be lit up because of the required starting voltage having been lowered, while immediately after the extinction it is difficult to be lit up because of the starting voltage being kept higher. Therefore, when the high-pressure discharge lamp 12 fails to be lit up by being intermittently applied the starting voltage for a predetermined time, at least the inverter circuit 19 is halted.

According to the second embodiment, the amplitude of the starting voltage applied to the high-pressure discharge lamp 12 becomes almost the same amplitude in every starting operation. Therefore, the bulb base 15 of the high-pressure discharge lamp 12 can be prevented from a breakdown. When the high-pressure discharge lamp 12 fails to be lit up in predetermined time, at least the inverter circuit 19 is halted. Therefore, a long-term used high-pressure discharge lamp which life-time has elapsed is safely exchanged.

Figure 9:
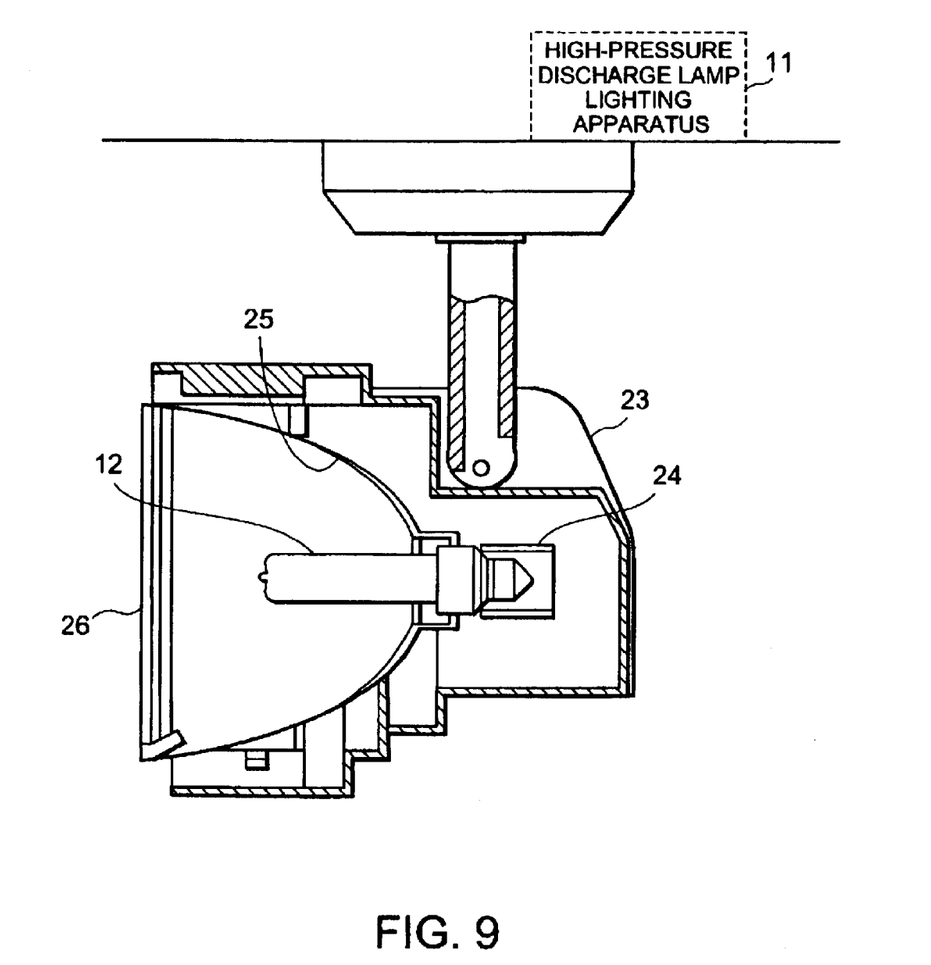
FIG. 9 is a section showing a luminaire according to the third embodiment of the invention.

Referring now to FIG. 9, a luminaire according to a further aspect of the present invention will be explained. FIG. 9 is a section showing a luminaire according to the third aspect of the present invention. The luminaire is comprised of the high-pressure discharge lamp lighting apparatus 11 according to the first or the second embodiment and a luminaire body capable of equipping the high-pressure discharge lamp 12. As shown in FIG. 9, the high-pressure discharge lamp 12 is mounted in the socket 24 of the luminaire body 23, and then lit up by the high-pressure discharge lamp lighting apparatus 11. The light emitted from the high-pressure discharge lamp 12 is irradiated outwards through a front glass 26 directly or reflecting on a reflector 25. According to the luminaire of the third embodiment, the luminaire also has the effect the same as that of the high-pressure discharge lamp lighting apparatus according to the first and the second embodiment.

According to one aspect of the present invention, the high-pressure discharge lamp 12 is steadily lit up at the frequency not causing an acoustic resonance and where the load power of the high-pressure discharge lamp 12 becomes to maximum. Therefore, acoustic resonance never occurs, but even if it moreover changes lamp voltage, rapid fluctuation of the load power of the high-pressure discharge lamp is restricted. The frequency is kept constant during the steady lighting operation of the high-pressure discharge lamp. Thereby, it is prevented from an abnormal high voltage abnormal being applied to the high-pressure discharge lamp in the lamp-life terminal.

According to another aspect of the present invention, a glow discharge to arc discharge transition is ensured in the high-pressure discharge lamp. Therefore, the high-pressure discharge lamp can be surely lit up. According to still another aspect of the present invention, with reference to the type of rare gas filled in the high-pressure discharge lamp with which it is applied, a glow discharge to arc discharge transition can be executed appropriately.

According to still another aspect of the present invention the high voltage for starting and then steadily lighting is intermittently applied, thereby when the high-pressure discharge lamp is in non-lighting state, it is prevented from continuously applying the high voltage to the high-pressure discharge lamp. According to still another aspect of the present invention the DC voltage of the booster circuit applied to the inverter circuit is controlled equivalently and the current supplied to the high-pressure discharge lamp is controlled equivalently, the starting voltage of the high-pressure discharge lamp is equivalently controllable. Therefore, it is prevented from applying an abnormal high voltage to the high-pressure discharge lamp, it becomes possible to miniaturize the bulb base of the high-pressure discharge lamp, and the high-pressure discharge lamp and the luminaire using the high-pressure discharge lamp can be downsized.

According to still another aspect of the present invention the inverter circuit is halted at least when the high-pressure discharge lamp fails to be lit up within a predetermined time, the high-pressure discharge lamp can be safely exchanged. According to still another aspect of the present invention the luminaire which has the effect that the high-pressure discharge lamp lighting apparatus of the aspect does so is obtained.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best aspect contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A high-pressure discharge lamp lighting apparatus, comprising:

an LC resonance circuit, wherein the LC resonance circuit has a resonance frequency set up in two to three times the steady lighting frequency of the high-pressure discharge lamp, and the LC resonance circuit is connected to the high-pressure discharge lamp;

a DC power source;

an inverter circuit, wherein the inverter circuit has an input terminal connected to the DC power source, and an output terminal connected to the high-pressure discharge lamp through the LC resonance circuit, and the inverter circuit converts the DC power of the DC power source into an AC power, and causes to start and steadily operate the high-pressure discharge lamp; and an inverter control circuit, wherein the inverter control circuit is connected to a control terminal of the inverter circuit, the inverter control circuit operates the inverter circuit at a frequency around or higher than the resonance frequency of the LC resonance circuit at the time of starting the operation of the high-pressure discharge lamp, and the inverter control circuit operates the inverter circuit at a frequency in a range lower than the resonance frequency of the LC resonance circuit and free from acoustic resonance in the steady lighting operation of the high-pressure discharge lamp.

2. A high-pressure discharge lamp lighting apparatus as claimed in claim 1, further comprising a starting control circuit, wherein the starting control circuit judges whether the high-pressure discharge lamp is in non-lighting state, and when it is judged that the high-pressure discharge lamp is in non-lighting state, the starting control circuit intermittently operates the inverter control circuit.

3. A high-pressure discharge lamp lighting apparatus as claimed in claim 2, further comprising a booster circuit, wherein the booster circuit is connected between the DC power supplies and the inverter circuits, the booster circuit keeps the DC voltage applied in the inverter circuit constant, and at the time of starting the operation of the high-pressure discharge lamp, the inverter control circuit controls the inverter circuit so that the output current of the LC resonance circuit becomes fixed.

4. A high-pressure discharge lamp lighting apparatus as Claimed in claim 2, wherein the starting control circuit keeps at least the inverter control circuit in an idle state when it is judged that the high-pressure discharge lamp is in non-lighting state for a predetermined time.

5. A high-pressure discharge lamp lighting apparatus, comprising:

an LC resonance circuit, wherein the LC resonance circuit has a resonance frequency set up in two to three times the steady lighting frequency of the high-pressure discharge lamp, and the LC resonance circuit is connected to the high-pressure discharge lamp;

a DC power source;

an inverter circuit, wherein the inverter circuit having an input terminal where the inverter circuit was connected to the DC power source, and an output terminal connected to the high-pressure discharge lamp through the LC resonance circuit, and the inverter circuit converts the DC power of the DC power source into an AC power, and causes to start and steadily operate the high-pressure discharge lamp; and an inverter control circuit, wherein the inverter control circuit is connected to control terminal of the inverter circuit, the inverter circuit operates the inverter control circuit for a predetermined time from the time of starting the operation of the high-pressure discharge lamp at a frequency around or higher than the resonance frequency of the LC resonance circuit, and the inverter control circuit operates the inverter circuit at a frequency in a range lower than the resonance frequency of the LC resonance circuit and free from acoustic resonance in the steady lighting operation of the high-pressure discharge lamp.

6. A high-pressure discharge lamp lighting apparatus as claimed in claim 5, wherein the high-pressure discharge lamp is the high-pressure discharge lamp with which Neon and Argon are filled as a discharge agent, and the predetermined time is for 1–10 seconds.

7. A high-pressure discharge lamp lighting apparatus as claimed in claim 5, wherein the high-pressure discharge lamp is the high-pressure discharge lamp with which Argon is filled as discharge agent, and the predetermined time is 0.1–1.5 seconds.

8. A luminaire, comprises:

a high-pressure discharge lamp lighting apparatus, comprising:

an LC resonance circuit, wherein the LC resonance circuit has a resonance frequency set up in two to three times the steady lighting frequency of the high-pressure discharge lamp, and the LC resonance circuit is connected to the high-pressure discharge lamp;

a DC power source;

an inverter circuit, wherein the inverter circuit has an input terminal connected to the DC power source, and an output terminal connected to the high-pressure discharge lamp through the LC resonance circuit, and the inverter circuit converts the DC power of the DC power source into an AC power, and causes to start and steadily operate the high-pressure discharge lamp; and an inverter control circuit, wherein the inverter control circuit is connected to a control terminal of the inverter circuit, the inverter control circuit operates the inverter circuit at a frequency around or higher than the resonance frequency of the LC resonance circuit at the time of starting the operation of the high-pressure discharge lamp, and the inverter control circuit operates the inverter circuit at a frequency in a range lower than the resonance frequency of the LC resonance circuit and free from acoustic resonance in the steady lighting operation of the high-pressure discharge lamp, and a main body capable of equipping the high-pressure discharge lamp operable with the high-pressure discharge lamp lighting apparatus.

9. A luminaire as claimed in claim 8, wherein the high-pressure discharge lamp is a ceramic discharge lamp.

* * * * *